United States Patent [19]
Haas

[11] Patent Number: 5,924,869
[45] Date of Patent: Jul. 20, 1999

[54] DEVOTIONAL AND LEARNING DEVICES

[75] Inventor: Gordon L. Haas, Kilauea, Hi.

[73] Assignee: Innovative Inventions, Ltd., Kilauea, Hi.

[21] Appl. No.: 08/928,830

[22] Filed: Sep. 12, 1997

[51] Int. Cl.⁶ .............................. G09B 19/00; G09F 11/30
[52] U.S. Cl. ............................. 434/245; 40/518; 40/904
[58] Field of Search .......................... 434/245; 40/471, 40/518, 904

[56] References Cited

U.S. PATENT DOCUMENTS

| | | | |
|---|---|---|---|
| 612,672 | 10/1898 | Pierce | 84/483.1 |
| 674,668 | 5/1901 | Bisler | 248/441.1 |
| 952,103 | 3/1910 | Eghian | 248/441.1 |
| 1,439,247 | 12/1922 | Letson | 40/518 |
| 1,705,668 | 3/1929 | Johnson | 281/51 |
| 2,419,802 | 4/1947 | Van Horne | 40/471 |
| 2,467,051 | 4/1949 | Reffner | 40/518 |
| 2,501,840 | 3/1950 | Bradford | 40/471 |
| 2,563,580 | 8/1951 | Clark | 40/518 |
| 3,089,269 | 5/1963 | McKiernan | 40/622 |
| 3,190,021 | 6/1965 | Gustafson | 40/518 |
| 5,517,778 | 5/1996 | Simson | 40/471 |

*Primary Examiner*—Robert A. Hafer
*Assistant Examiner*—Michael B. Priddy
*Attorney, Agent, or Firm*—William Patrick Waters

[57] ABSTRACT

Devotional and learning devices for displaying individual frames of scrolls containing scriptural passages, prayers and quotations from the teachings of saints, sages, mystics and divinities, which scrolls, when displayed, are illuminated with light of sufficiently low intensity so that the individual frames of said scrolls can be comfortably viewed by the user of one of these devices in an otherwise unilluminated room and at the same time the interior of said otherwise unilluminated room is substdantially imperceptible in the peripheral vision of said user.

11 Claims, 15 Drawing Sheets

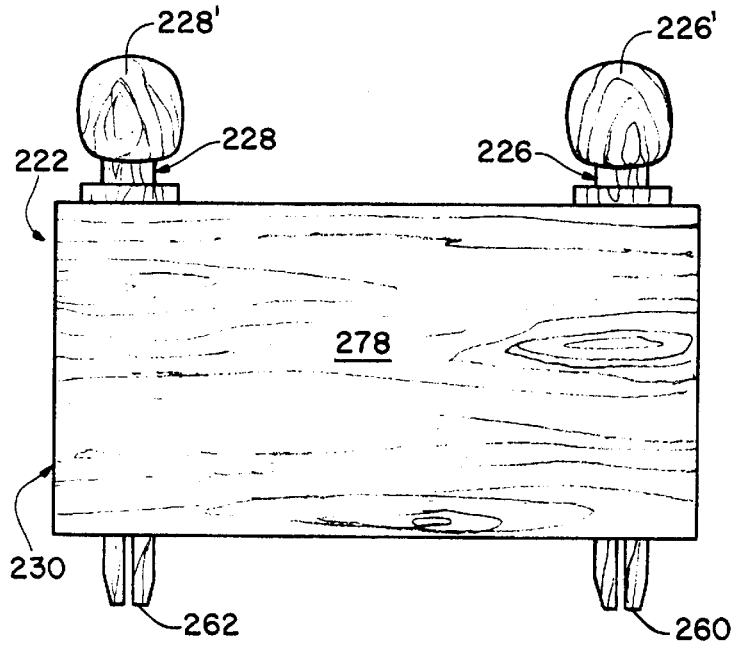
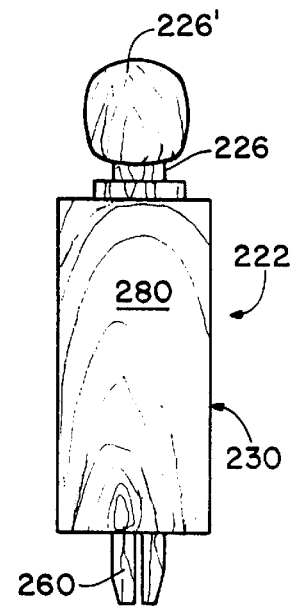
FIG. 23     FIG. 24
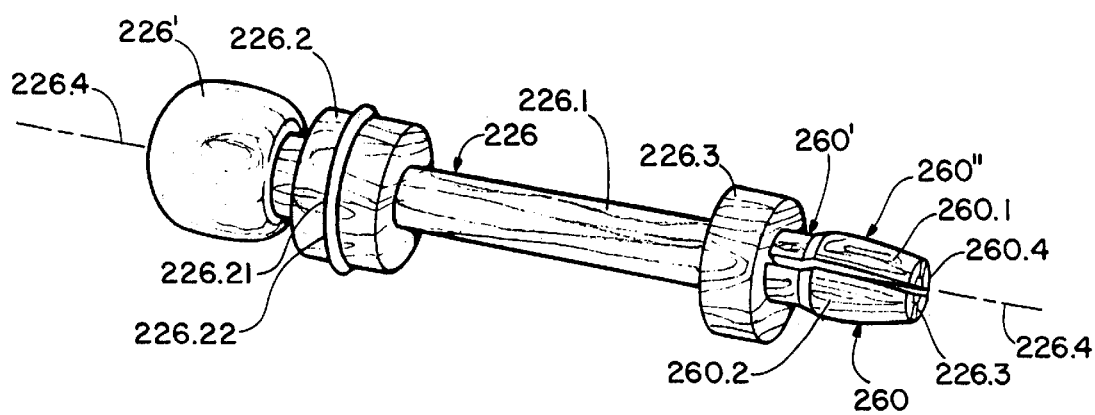
FIG. 25

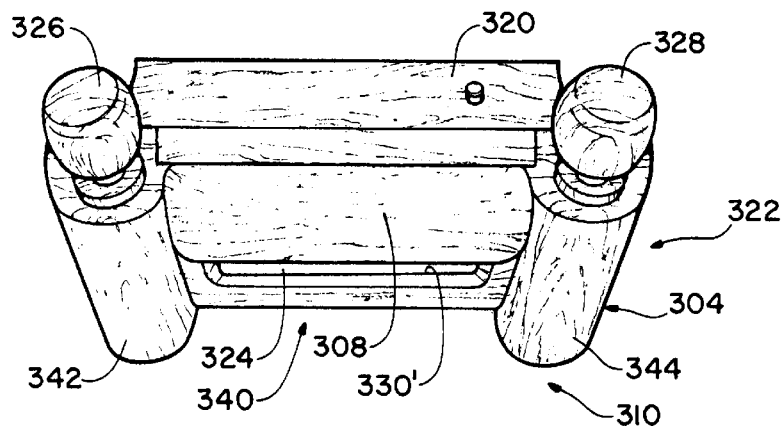
FIG. 28
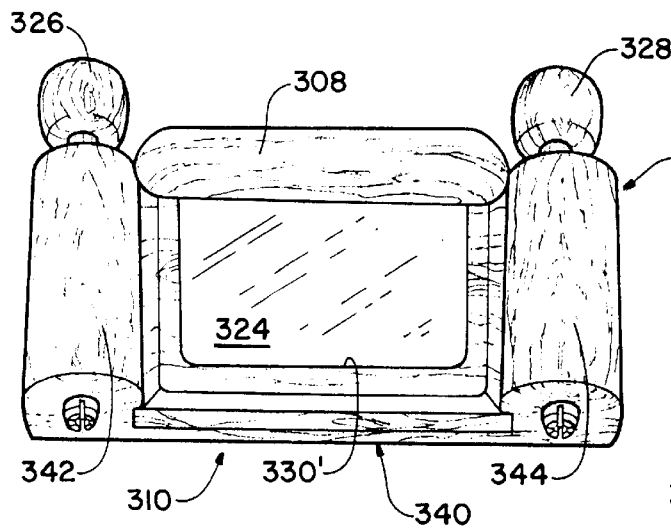 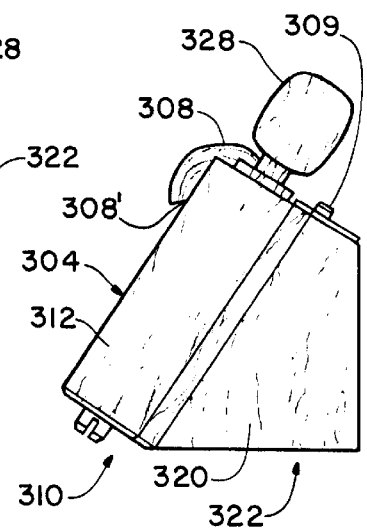
FIG. 29    FIG. 31
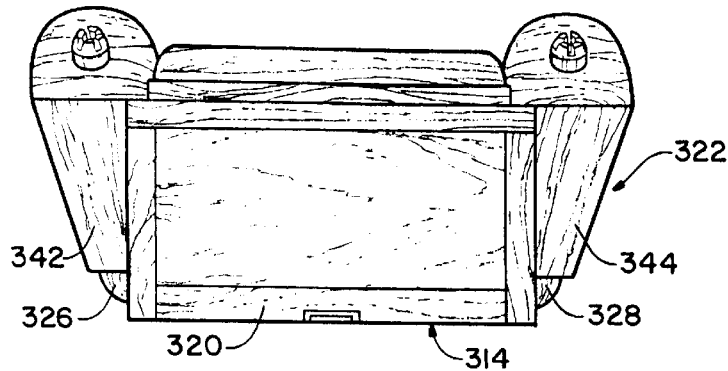
FIG. 30

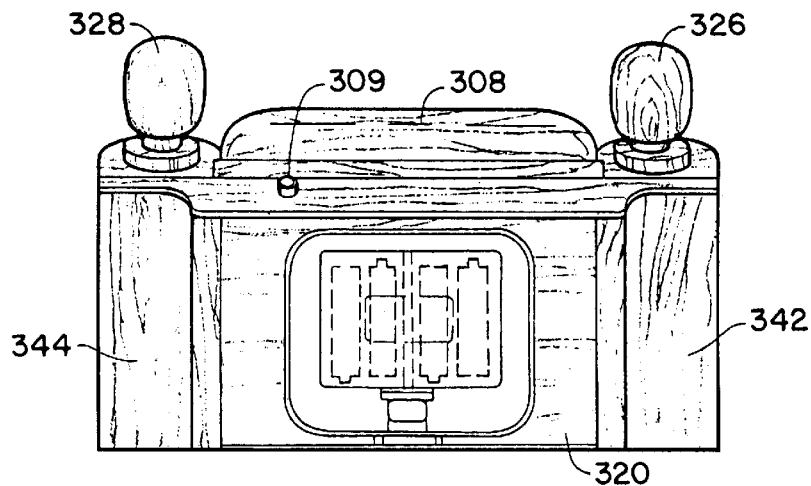
FIG. 32
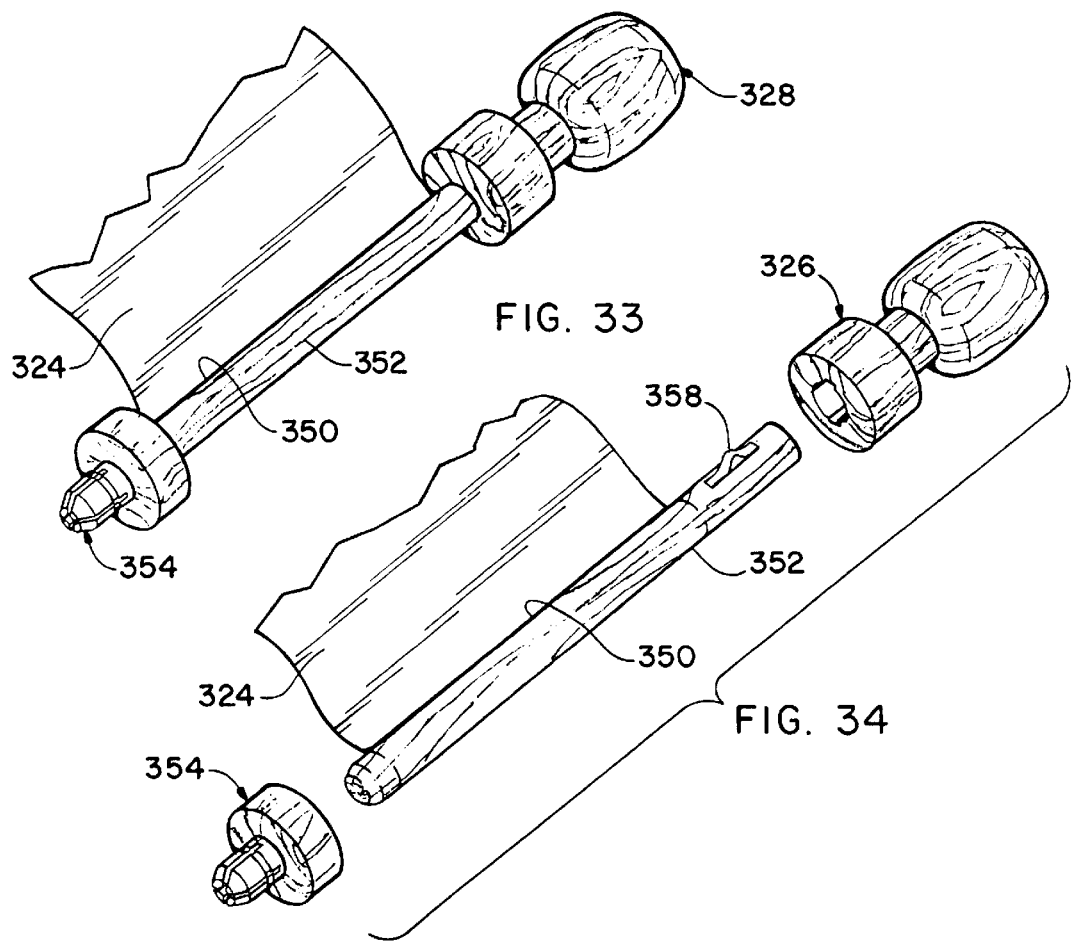
FIG. 33
FIG. 34

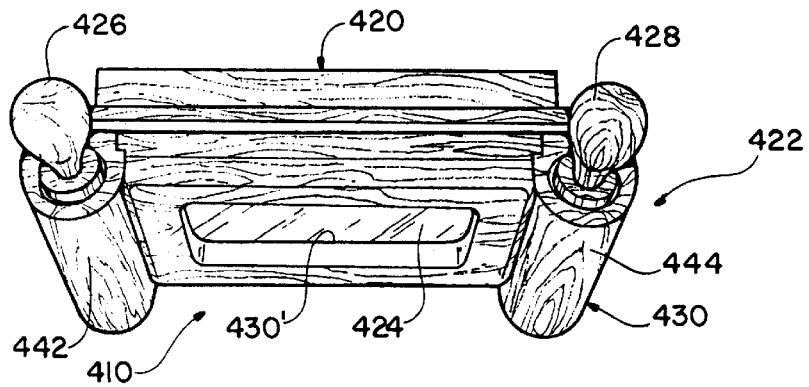
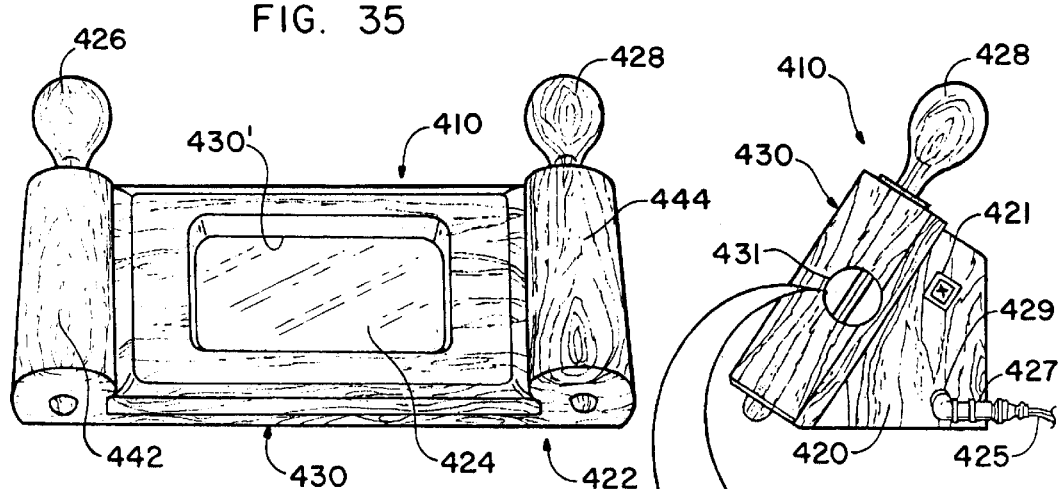
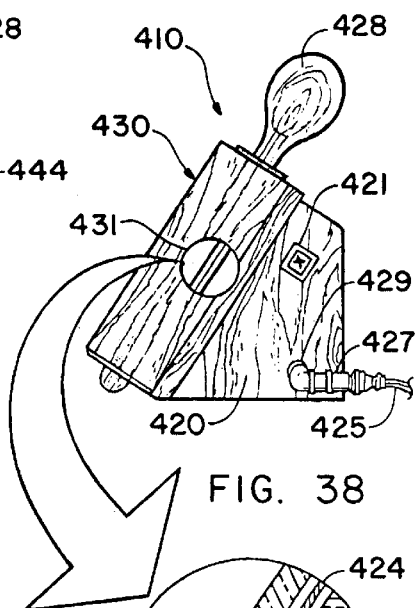
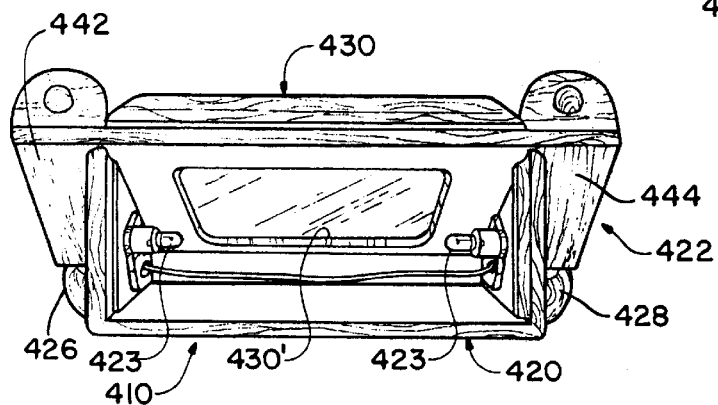
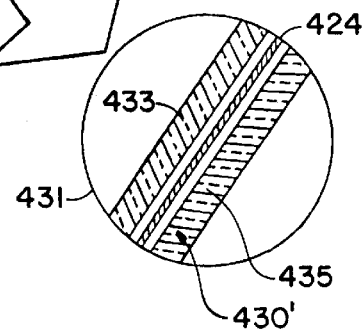

DEVOTIONAL AND LEARNING DEVICES

BACKGROUND OF THE INVENTION

FIELD OF THE INVENTION

The present invention relates to devotional and learning devices, and more particularly to devices for use in devotional exercises, practices and disciplines, and in the study, learning and assimilating of spiritual principles, precepts and teachings, whereby an individual is encouraged to meditate upon, decipher and apply the profound and practical truths revealed in the holy scriptures of mankind.

DESCRIPTION OF THE PRIOR ART

Devotional devices have long been well known in the prior art, some since ancient times.

Among such prior art devotional devices are crucifixes, rosaries, relics, and two-dimensional representations of objects of contemplation and devotion, such as saints, sages mystics, and divinities, and writings such as scriptural passages, prayers and quotations from the sayings and writings of such saints, sages and mystics, and divinities, and graphic symbols representative of such saints, sages, mystics and divinities.

In general, however, such prior art devotion and meditation enhancing devices have not satisfied all of the objects of the present invention, as set out hereinbelow.

SUMMARY OF THE INVENTION

Accordingly, it is an object of the present invention to provide spiritual, devotional and learning devices each of which serves as a learning aid and also, in a dimly lit or otherwise completely unlighted room, serves to establish a pervasive devotional environment. The focus of the present invention is the study and assimilation of manually selectable scriptural passages, one at a time, and especially passages selected from the Old and New Testaments of the Christian Bible.

In accordance with a yet further principal feature of the present invention each of said scroll housings is provided with spindle bearing means whereby a spindle of a scroll of the present invention may be freely rotatably mounted therein.

For a fuller understanding of the nature and objects of the present invention, reference should be had to the following detailed description, taken in connection with the accompanying drawings.

BRIEF DESCRIPTION OF THE DRAWINGS

FIG. 23 is a rear view of the lectern of the second preferred embodiment of the present invention, containing a scroll thereof;

FIG. 24 is a side view of the lectern of the second preferred embodiment of the present invention, containing a scroll thereof;

FIG. 25 is a perspective view of a scroll spindle of the second preferred embodiment of the present invention;

FIGS. 28 through 31 are, respectively, top, front, bottom and side views of the devotional and learning device of the third preferred embodiment of the present invention shown in FIG. 27;

FIG. 32 is a rear view of the lectern of the third preferred embodiment of the present invention, showing the battery compartment thereof;

FIG. 33 is a perspective view of a scroll spindle of the third preferred embodiment of the present invention in its fully assembled condition;

FIG. 34 is an exploded perspective view of a scroll spindle of the third preferred embodiment of the present invention;

FIG. 35 is a plan view of a devotional and learning device of the fourth preferred embodiment of the present invention;

FIG. 36 is a front view of the devotional and learning device shown in FIG. 35;

FIG. 37 is a bottom view of the devotional and learning device shown in FIG. 35;

FIG. 38 is a side view of the devotional and learning device shown in FIG. 35;

FIG. 38A is an enlarged view of a small portion of FIG. 38; and

DESCRIPTION OF THE PREFERRED EMBODIMENTS

Figure 1:
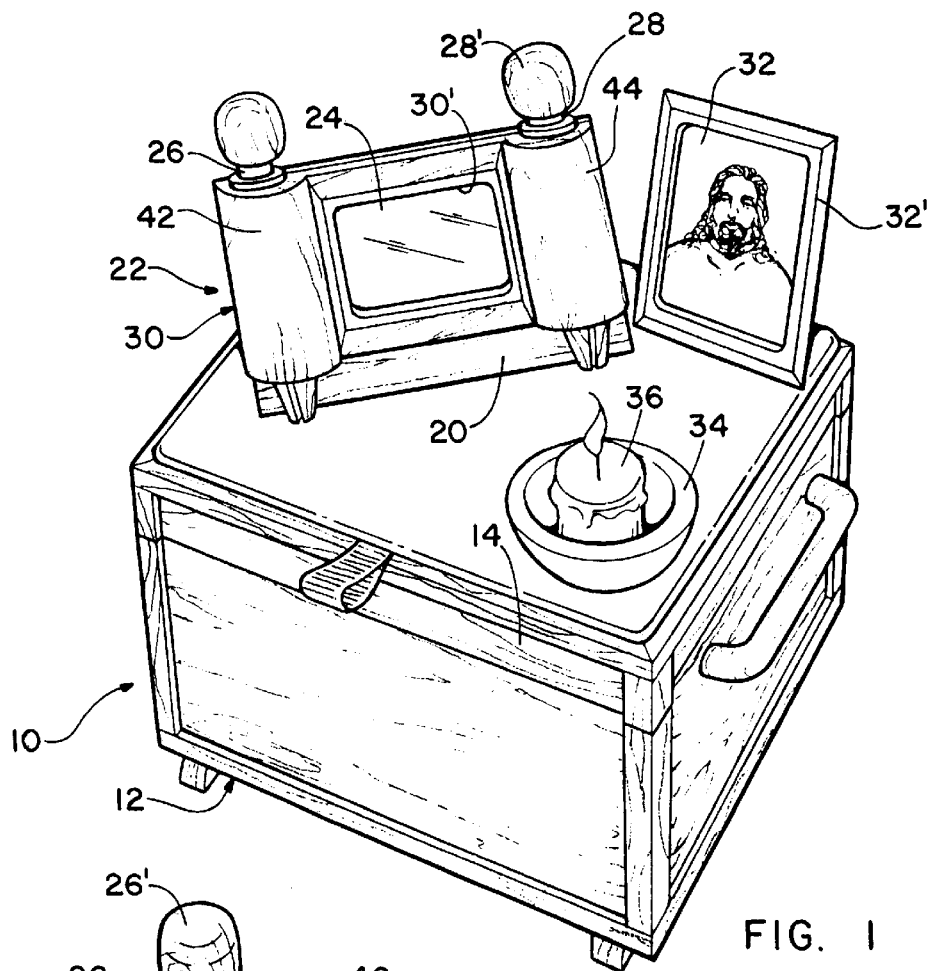
FIG. 1 is a perspective view of a devotional learning device of the first preferred embodiment of the present invention in a particular configuration of the parts thereof.

Referring now to FIG. 1, there is shown a devotional and learning device 10 of the first preferred embodiment of the present invention.

Figure 12:
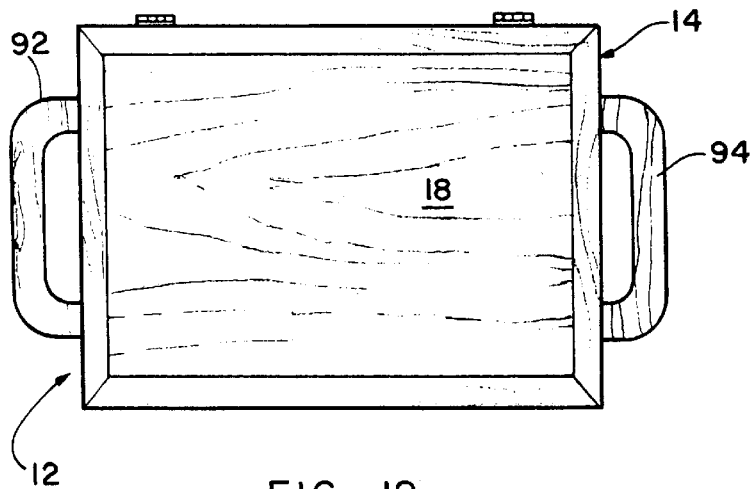
Figure 13:
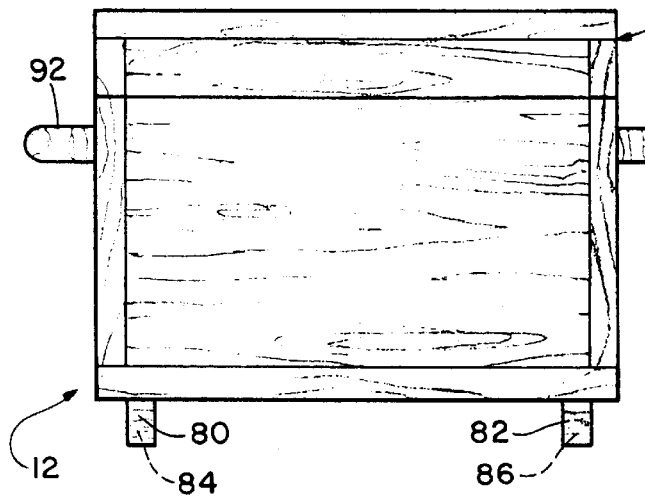

Devotional and learning device 10 is comprised of a chest 12 with a hinged lid 14. A pad 16 of carpeting or the like which is adhered to a rigid or semi-rigid backing member is disposed upon closed lid 14, and is of substantially the same dimensions as the recessed main panel 18 (FIG. 12) of lid 14.

Figure 7:
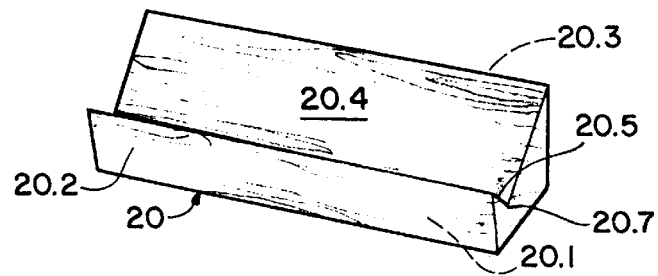
FIG. 7 is a perspective view of a display device support, lectern support or pedestal of the first preferred embodiment of the present invention.

A pedestal 20 is disposed upon pad 16, as seen in FIG. 1. Pedestal 20 is shown in FIG. 7, and described in detail in connection therewith.

A scroll display device or lectern 22, which is a principal feature of the present invention, is disposed upon pedestal 20, as seen in FIG. 1. Lectern 22 is shown in detail in FIGS. 2 through 6, and is described in detail hereinbelow in connection therewith.

Figure 2:
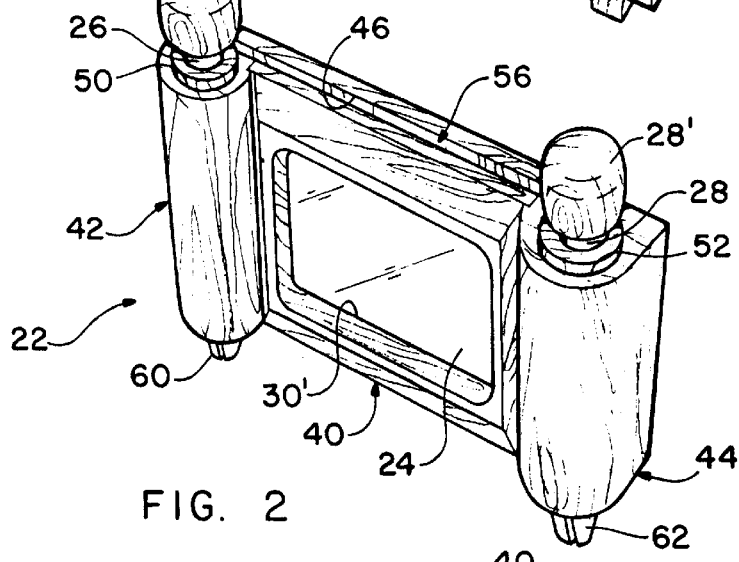
FIG. 2 is a perspective view of the scroll displaying device or lectern of the first preferred embodiment of the present invention shown in FIG. 1.

A scroll 24, which is mounted on scroll spindles 26 and 28, is contained in a slot 46 in the body 30 of lectern 22, as seen in FIG. 2.

Figure 6:
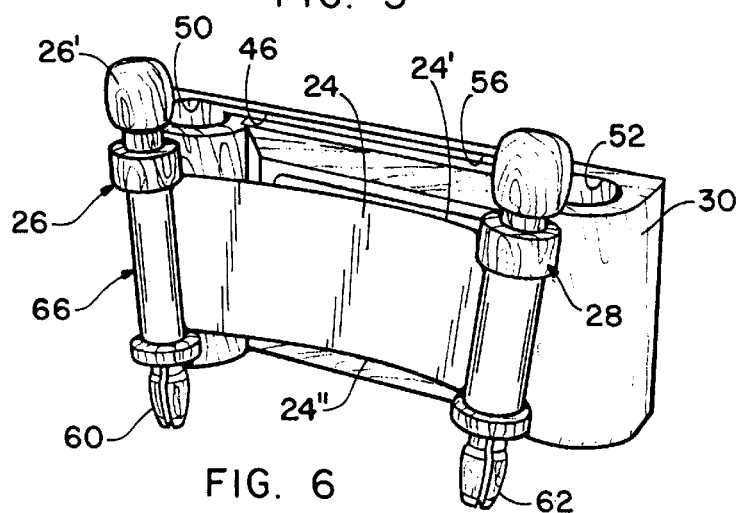
FIG. 6 is a perspective view of a scroll of the first preferred embodiment of the present invention as seen immediately after its removal from the display device, which is also seen in FIG. 6.

Lectern body 30, separated from scroll 24 and its associated spindles 26 and 28, is shown in FIG. 6.

As may be seen by comparison of FIGS. 2 and 6, display device or lectern 22 is a lectern body 30 containing a scroll 24 carried by a pair of spindles 26, 28.

Figure 5:
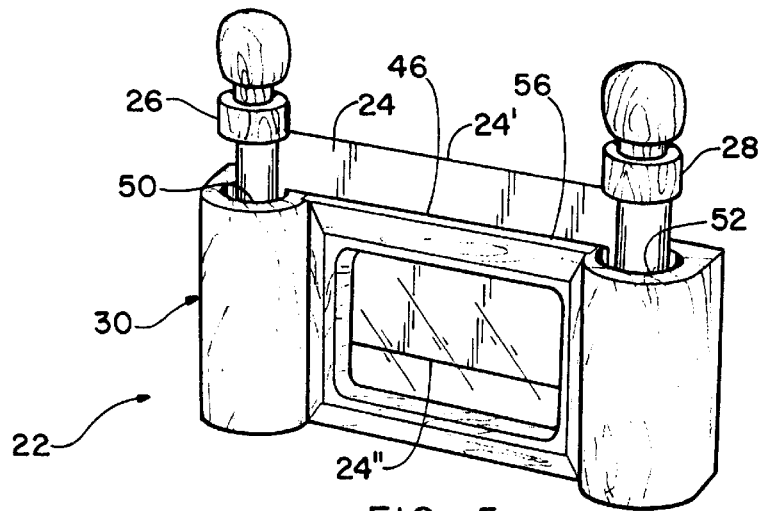
FIG. 5 is a perspective view of the lectern shown in FIG. 2 as seen during the process of loading a scroll thereinto.

It is to be noted that the portion of scroll 24 shown in FIG. 1 is different from the portion of scroll 24 shown in FIGS. 2, 5, and 6, in that each bears a different scriptural passage. It is to be understood that most of the scrolls of the present invention are arranged for horizontal reading or viewing, i.e., that the lines of text imprinted thereupon are parallel to the major edges thereof, e.g., edges 24' and 24" of scroll 24 (FIG. 6), and that any portraits, graphic symbols or designs imprinted upon a scroll of the present invention are transversely oriented, i.e., for viewing with the major axis of the scroll, which is parallel to the major edges of the scroll, horizontally disposed.

Referring again to FIG. 1, it will be seen that lectern 22 is provided with a scroll display window 30' through which a single area or frame of scroll 24 can be viewed at one time.

The term "window" as used herein embraces both an open frame and a frame containing one or more panes of transparent material, such as glass or certain transparent plastic sheet materials.

The term "non-transparent" as used herein denotes translucent or opaque materials, but not completely transparent materials.

It is to be understood that in most cases the text imprinted on a scroll of the present invention will be grouped into separate areas or frames, each of which areas or frames can be individually viewed through scroll display window 30' at one time.

Each of these areas or frames can be thought of as bounded by upper and lower borders, each of which borders is parallel to the major axis of the scroll, and also bounded by left and right borders which are perpendicular to the major axis of the scroll. In some embodiments of the invention, these borders will not be imprinted on the scroll, and in other embodiments these borders will be imprinted on the scroll. Whether the frame borders are imprinted or not, the text of each single frame will be contained within the borders.

Referring again to FIG. 1 it will be seen that, in accordance with a principal feature of the present invention, lectern 22 is disposed upon pedestal 20 and thus is maintained at a convenient viewing angle with respect to the top of pad 16 for viewing and for convenient manipulation of knobs 26' and 28' of spindles 26 and 28.

Figure 16:
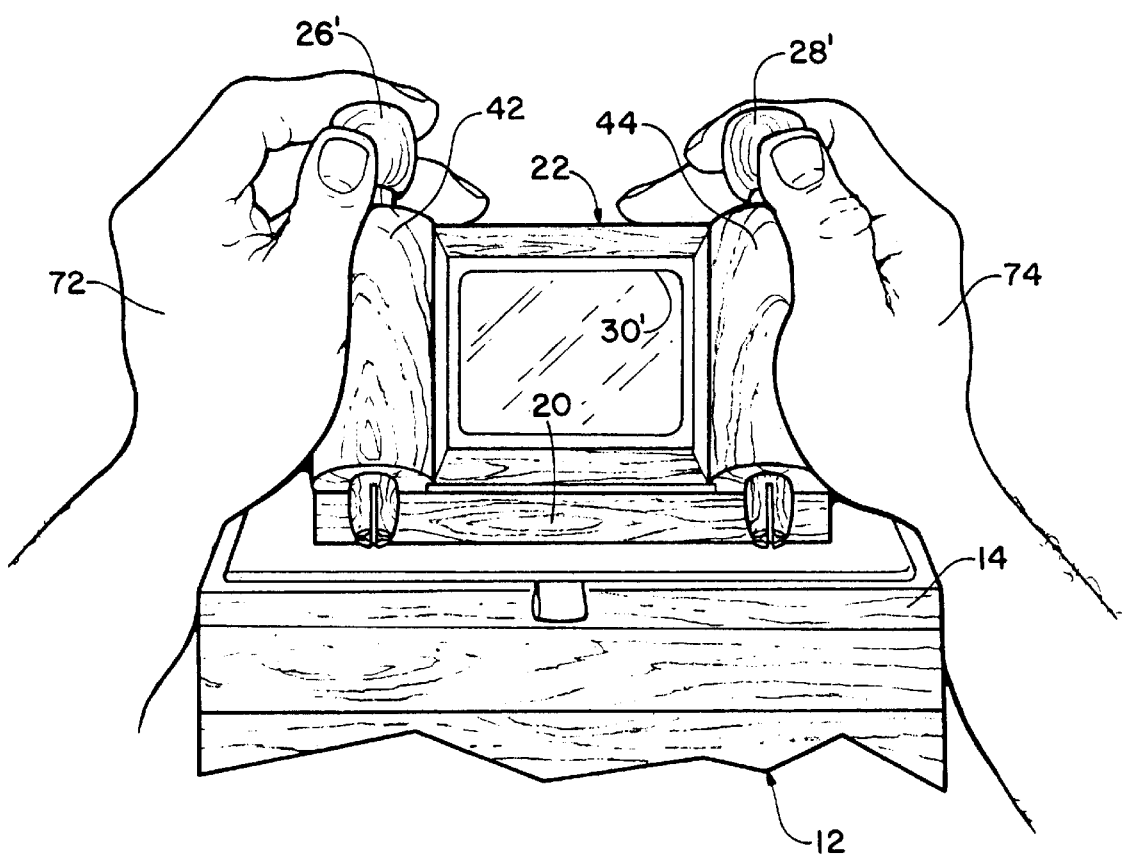
FIG. 16 is a perspective view of the upper portion of the chest of the devotional learning device of the first preferred embodiment of the present invention with the lectern, lectern support and pad disposed thereon and showing the preferred method manually operating the device of the first preferred embodiment of the present invention.

It will now be understood that while a devotional learning device 10 of the kind shown in FIG. 1 is intended for substantially permanent placement in the established place of devotion or learning of the user thereof, it can also be used when the user is traveling, in which case pad 16 and the elements located thereon in FIG. 1 may be packed in chest 12 for transportation to the temporary traveling quarters of the user, where the devotional learning device will be set up as in FIG. 1 during inactive periods, and reconfigured somewhat as shown in FIG. 16 during periods of active meditation, contemplation, devotion, or learning.

It is further to be understood that when such an active period occurs in a dimly lit or completely darkened hotel room or the like, candle 36 in dish 34 will be disposed on pad 16, between lectern 22 and the front edge of pad 16, or in any other juxtaposition which provides ample light for reading the text imprinted on scroll 24.

It is yet further to be noted that both lectern 22 and chest 12 are preferably fabricated from wood, preferably a high grade of furniture wood, so that the tactile sensation imparted to the user will be that of traditional devotional apparatus, and not the tactile sensation of a plastic or metallic cabinet, such as that of a computer or other piece of business equipment or the like. In certain embodiments of the invention, however, this feature of the invention may be foregone, and materials such as plastics employed for reasons of economy, especially in a children's version wherein a night light is incorporated into the chest or lectern.

Referring now to FIG. 2, there is shown lectern 22, without pedestal 20. As seen in FIG. 2, lectern 22 is comprised of a main body portion 40, a left spindle housing 42, and a right spindle housing 44.

It is to be particularly noted that a slot 46 passes through the upper face of main body portion 40. It is also to be noted that spindle housing 42 defines a spindle receiving well 50, and that spindle housing 44 defines a spindle receiving well 52.

Thus, it will be seen that lectern 22 defines a scroll receiving cavity 56 which is comprised of spindle receiving well 50, spindle receiving well 52, and slot 40, all of which are joined together to define a single scroll receiving cavity 56.

As also seen in FIG. 2, the lower ends 60 and 62 of the respective spindles 26 and 28 project through corresponding holes 50', 52' provided in the respective bottom walls of spindle wells 42 and 44, and the upper ends of spindles 26 and 28, and especially knobs 26' and 28' which are integral parts of respective spindles 26 and 28, project upwardly from the upper surface of main body portion 40 and spindle housings 42 and 44.

As will be evident to those having ordinary skill in the art, informed by the present disclosure, scroll 24 extends from spindle 26 to spindle 28, and is wrapped around or otherwise affixed to them both.

Figure 3:
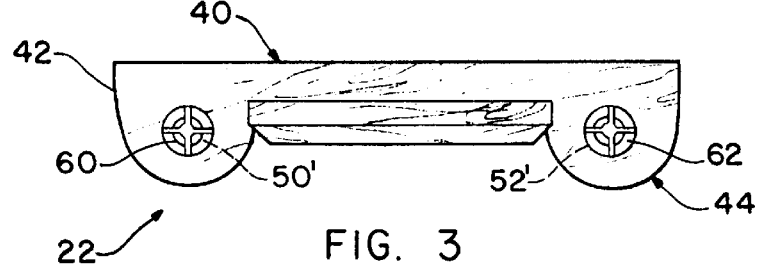
FIG. 3 is a bottom view of the lectern of the present invention shown in FIG. 2.

FIG. 3 is a bottom view of lectern 22, showing the projection of the lower ends 60 and 62 of spindles 24 and 26, respectively, from the bottom walls of spindle housings 42 and 44, and also showing the main body portion 40 thereof.

Figure 4:
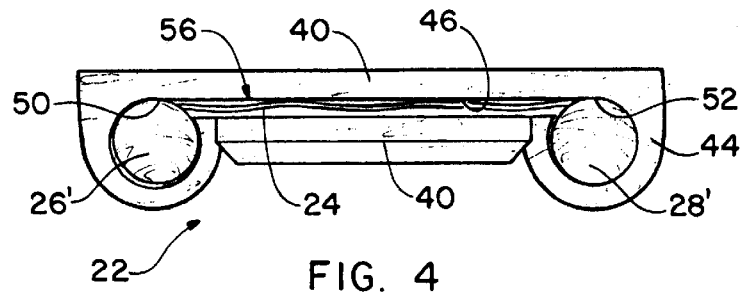
FIG. 4 is a top view of the lectern of the present invention shown in FIG. 2.

As seen in FIG. 4, knobs 26', 28' project from the upper face of lectern 22, and scroll receiving slot 46 extends from spindle well 50 to spindle well 52, and into them both.

Referring now to FIG. 5, it will be seen that spindles 26 and 28, and scroll 24 affixed thereto, are simultaneously lifted from wells 50 and 52 and scroll slot 46, i.e., from cavity 56, when it is desired to remove scroll 24 from lectern body 30 and replace it with another scroll.

Figure 10:
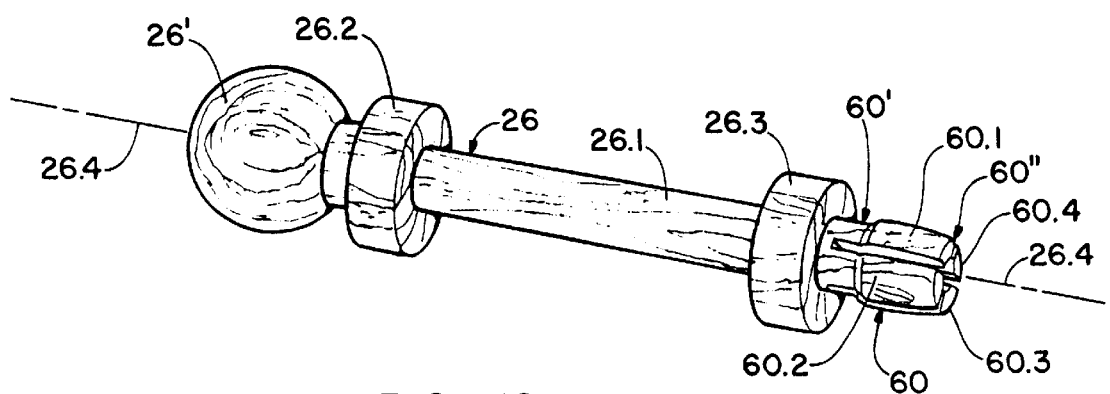
FIG. 10 is a perspective view of a scroll spindle of the first preferred embodiment of the present invention.
Figure 11:
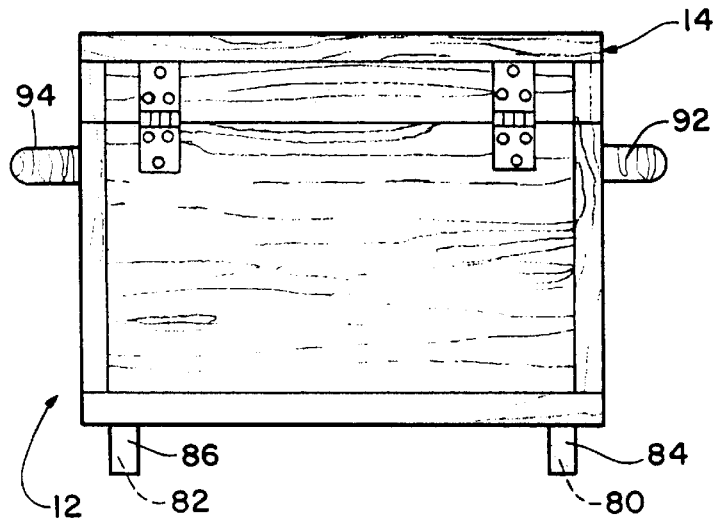
FIGS. 11 through 14 are respectively back, top, front and side views of the chest of the devotional learning device of the first preferred embodiment of the present invention.

Comparing FIGS. 6 and 10, it will be seen that scroll assembly 66 (FIG. 6) is comprised of scroll 24 and two associated scroll spindles 26 and 28, each end of scroll 24 being affixed to or interengaged with its associated scroll spindle, and scroll 24 being rolled on the respective scroll spindles 26 and 28 until the scroll spindles 26 and 28 are spaced apart by the distance between the axes of symmetry of spindle wells 50 and 52.

Scroll 24 may be affixed to spindles 26 (and 28) by means of tabs formed from the respective ends of scroll 24, which tabs are engaged in slats formed in the respective spindles 26, 28. Further, retaining clips may be provided for retaining each tab in its associated slot.

As seen in FIG. 10, spindle 26 is completely fabricated from wood, and may be fabricated from a single piece of wood, or from plural pieces of wood.

The lower end 60 of spindle 26 is subdivided into four adjacent prongs or fingers 60.1, 60.2, 60.3 and 60.4.

The inner end of each of these fingers is recessed in such manner that the inner end 60' of lower end 60 is smaller in diameter than the remainder 60" of lower end 60.

Thus, each finger 60.1, 60.2, 60.3, 60.4 is made somewhat resilient, and can be resiliently bent inward toward the other fingers.

It is also to be noted that the diameter of toroidal recess 60' (FIG. 10) is less than the diameter of its associated hole 50' in the bottom wall of spindle well 50, while the maximum diameter of lower end 60 is greater than the diameter of associated hole 50' in the bottom wall of spindle well 50.

It follows, then, that when spindle 26 is thrust deeply into spindle well 50 lower end 60 will be forced through hole 50', permitted by the inward bending of fingers 60.1 60.2, 60.3 and 60.4, until toroidal recess 60' is located in hole 50', at which time spindle 26 is captive in spindle well 50, but is freely rotatable therein.

Spindle 28 is substantially identical to spindle 26, and the hole 52' in the bottom wall of spindle well 52 is of the same diameter as that of hole 50'.

Thus, it will be seen, by those having ordinary skill in the art, informed by the present disclosure, that spindle 28 is captive but freely rotatable in its associated spindle well 52.

As further seen in FIG. 10, the central portion 26.1 of spindle 26 is of relatively small diameter and the upper and lower ends of central portion 26.1 are defined by bearing portions 26.2 and 26.3, both of which fit closely within spindle well 50. Thus, when spindle 26 is captive in spindle well 50 the major axis 26.4 of spindle 26 is kept substantially coincident with the major axis of spindle well 50 by bearing portions 26.2 and 26.3.

Spindle 28 is substantially identical to spindle 26, and thus spindle 28, when thrust deeply into spindle well 52, will become captive in spindle well 52 and will be freely, substantially coaxially rotatable therein.

It follows that both spindle 26 and spindle 28 are respectively captive in their associated spindle wells 50 and 52, and freely, substantially coaxially rotatable in their respective associated spindle wells 50 and 52, and that thus the respective spindles can be manually rotated by means of knobs 26' and 28', whereby to move scroll 24 through scroll display window 30', and thus to locate any desired frame on scroll 24 in display window 30'.

Referring now to FIG. 7, it will be seen that pedestal 20 is a single block of wood having a bottom face 20.1, a front face 20.2 perpendicular to bottom face 20.1, and a rear face 20.3 perpendicular to bottom face 20.1.

As also seen in FIG. 7, pedestal 20 is further provided with two obliquely disposed faces 20.4 and 20.5 which are non-parallel to any of the other faces 20.1, 20.2, and 20.3, but are perpendicular to each other. In other words, the angle 20.7 defined between them is a right angle.

As best seen in FIG. 1 and in FIG. 16, the angles of inclination of faces 20.4 and 20.5 of pedestal 20 are such that when pedestal 20 is disposed upon pad 16, which is itself disposed upon recessed panel 18 of the top of chest 12, and lectern 22 is disposed in the trough formed by faces 20.4 and 20.5, then display window 30' is disposed at such an angle to the horizontal top of chest 12 as to be comfortably viewed by a user sitting immediately in front of chest 12 with lid 14 approximately at his or her upper chest level, said user being seated in a substantially upright position and grasping spindle housings 42 and 44 with his or her left and right hands, respectively, as seen in FIG. 16.

As also seen in FIG. 16, the angular orientation of spindle housings 42 and 44 when lectern 22 is disposed in the trough of pedestal 20 is such that the user's respective hands 72, 74, when the user is seated as abovedescribed, can comfortably grasp the lectern 22, with a spindle housing in the palm of each hand, and the thumb and forefinger of each hand 72, 74 respectively grasping the knobs 26' and 28' of the spindle housing which is in the palm of the same hand.

Figures 8, 9:
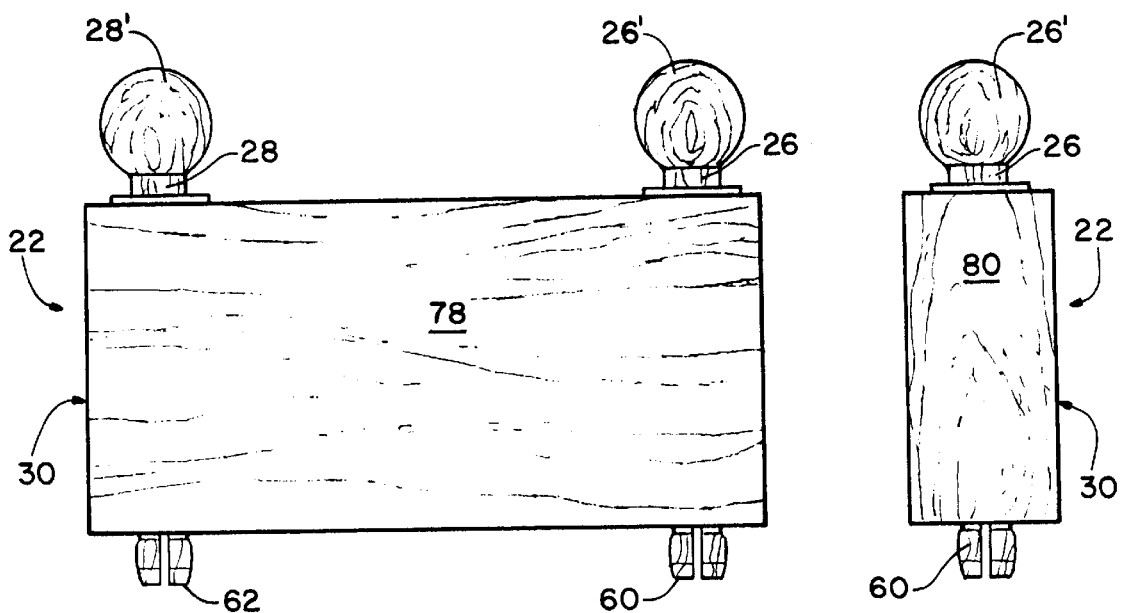
FIG. 8 is a rear view of the lectern of the first preferred embodiment of the present invention.
FIG. 9 is an end view of the lectern of the first preferred embodiment of the present invention.

Referring now to FIG. 8, it will be seen that the rear face 78 of the body 30 of lectern 22 is a flat, planar face, without ornamentation and without apertures or the like, but is finished in the same way as the other surfaces of lectern body 30.

As further seen in FIG. 9, the end of lectern body 30 there shown is also a flat, planar face, without ornamentation and without apertures or the like, and is finished in the same way as the other surfaces of lectern body 30.

Referring now to FIGS. 11, 12, 13 and 14, it will be seen that chest 12 generally takes the form of a rectilinear parallelepiped, supported on legs 80, 82, 84 and 86.

Figure 14:
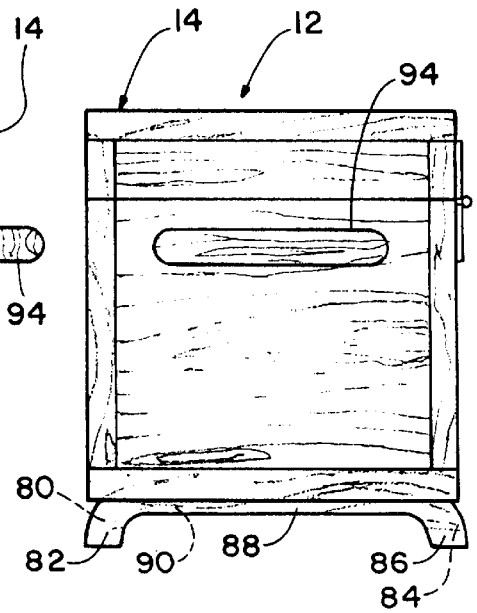

Also, as best seen in FIG. 14, each pair of front and rear legs is joined together by an integral joining member; legs 82 and 86 being joined together by a joining member 88 and legs 80 and 84 being joined together by a joining member 90.

Certain embodiments of the invention may be unprovided with such legs.

As also seen in FIGS. 11, 12, 13 and 14, chest 12 is provided with a pair of handles 92 and 94 which in general visually harmonized with the remainder of chest 12, and are preferably fabricated from a high quality furniture wood.

Figure 15:
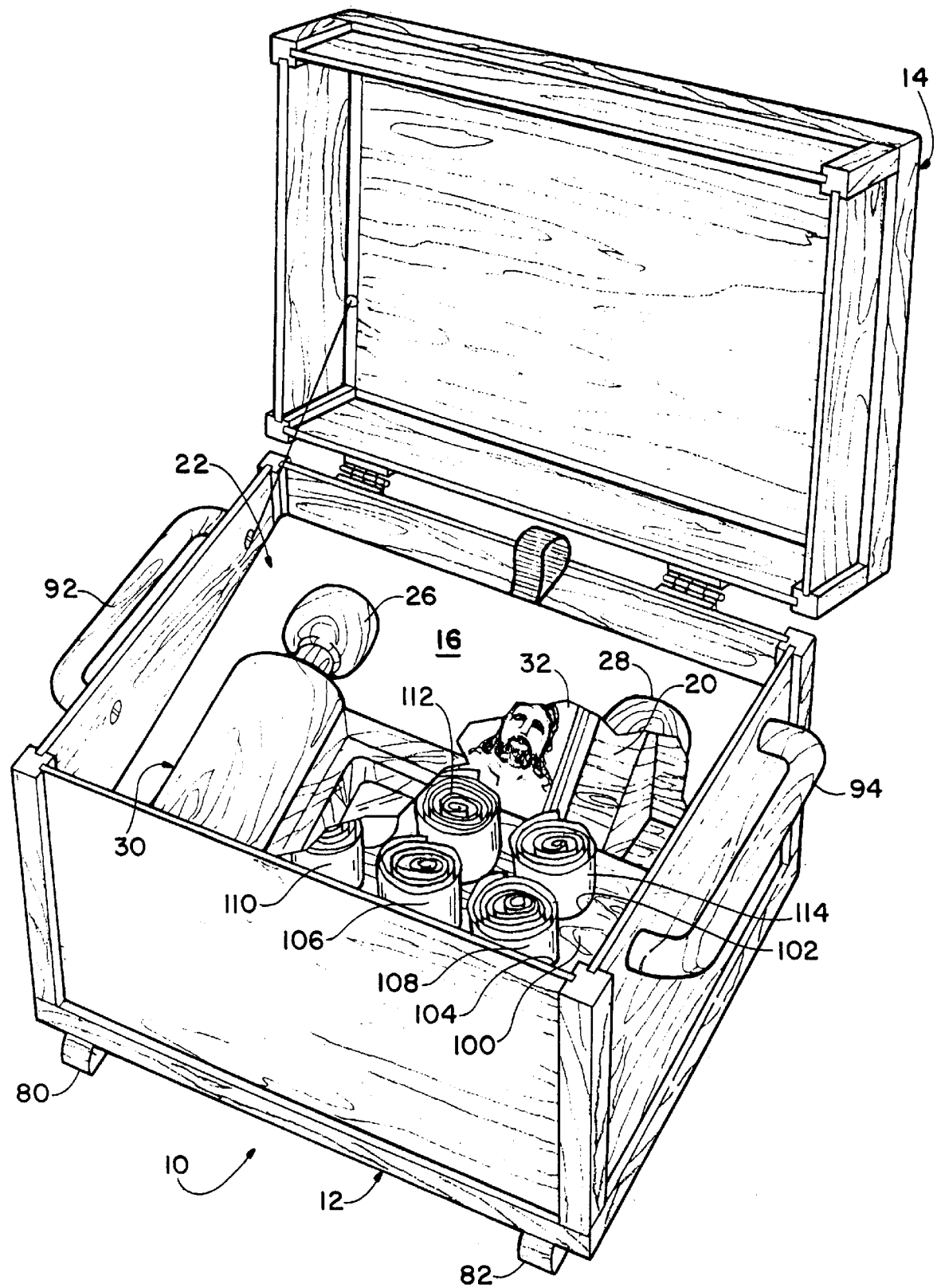
FIG. 15 is a perspective view of the chest of the first preferred embodiment of the present invention, shown in its open condition and displaying its contents.

Referring now to FIG. 15, devotional learning device 10 is shown in its travel-ready configuration, in which it is ready to be carried by the user who is traveling and thus is away from his or her normal place of devotion and learning.

As seen in FIG. 15, lid 14 of chest 12 is lifted to expose the interior thereof.

It is to be understood that chest 12 is of such shape and size that all of the other parts of devotional learning device 10 can be disposed therein, and lid 14 closed.

For example, pad 16 (FIG. 1) can be close-fittingly disposed within chest 12 as seen in FIG. 15; lectern 22 is then capable of being disposed within chest 12, above the top of pad 16.

As seen in FIG. 15, portrait 32 (FIG. 2) is also contained in chest 12, directly beneath pad 16, and reposing upon pedestal 20.

Also contained in chest 12 is an organizing block 100, provided for the purpose of organizing a plurality of scrolls contained in chest 12.

Organizing block 100 is provided with a plurality of bores 102, 104, etc., each of which is capable of receiving a rolled scroll 106, 108, 110, 112, 114, etc.

It is to be noted that in the particular version of the first preferred embodiment of the present invention shown in FIG. 15 the scrolls contained in chest 12 are not provided with spindles affixed thereto. In this version of the first preferred embodiment of the present invention the spindles 26 and 28 of lectern 22 are provided with quick fastening means for quickly fastening the respective ends of any of the scrolls stored in chest 12 to the respective spindles 26 and 28. The scrolls may be affixed to the associated spindles by cooperating tabs and slots, as described hereinabove.

For example, the shaft or central portion 26.1 (FIG. 10) of spindle 26 (and the shaft of spindle 28) may both be so slotted as to respectively receive one of the ends of the same scroll, whereby that scroll may be passed through the slots in the shafts of the associated spindles and a part of the scroll wound on the shaft of each spindle to frictionally engage the respective ends of that scroll with spindles 26 and 28. Other means for temporarily fastening a scroll of the present invention to its associated spindles will occur to those having ordinary skill in the art, informed by the present disclosure, without the exercise of invention or undue experimentation.

Referring now to FIGS. 17 through 26, there is shown a devotional and learning device 210 of the second preferred embodiment of the present invention.

Devotional and learning device 210 is comprised of a chest 212 having a hinged lid 214. A pad 216 of carpeting or the like which is adhered to a semi-rigid backing member is disposed upon closed lid 214.

Figure 17:
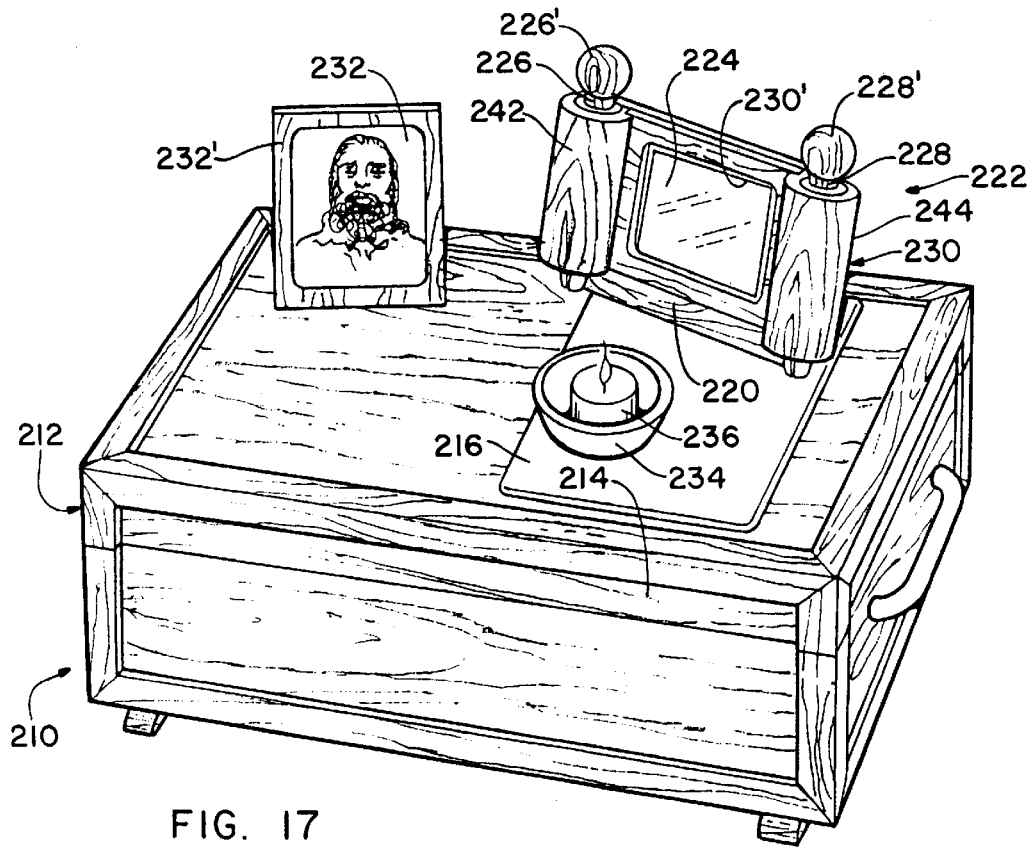
FIG. 17 is a perspective view of a devotional learning device of the second preferred embodiment of the present invention in a particular configuration of the parts thereof.

A pedestal 220 is disposed upon pad 216, as seen in FIG. 17. Pedestal 220 is similar to, and may be substantially identical to, pedestal 20 of the first preferred embodiment, as shown in FIG. 7 and described hereinabove in connection therewith.

A scroll display device or lectern 222 of the present invention, is disposed upon pedestal 220.

A scroll 224, which is mounted on scroll spindles 226, 228, is contained in the body 230 of lectern 222, as seen in FIG. 17.

For descriptions of elements common to the first and second preferred embodiments, it should be noted that the reference numeral designating a particular part of the first preferred embodiment may be obtained by subtracting 200 from the reference numeral designating the corresponding part of the second preferred embodiment, except as noted hereinafter.

Thus, it will be seen that lectern 222 is comprised of a body 230 which generally corresponds to lectern body 30 of the first preferred embodiment (FIG. 1).

Scroll 224 and its associated spindles 226, 228 are contained in body 230 of lectern 222, as seen in FIG. 17.

Figure 18:
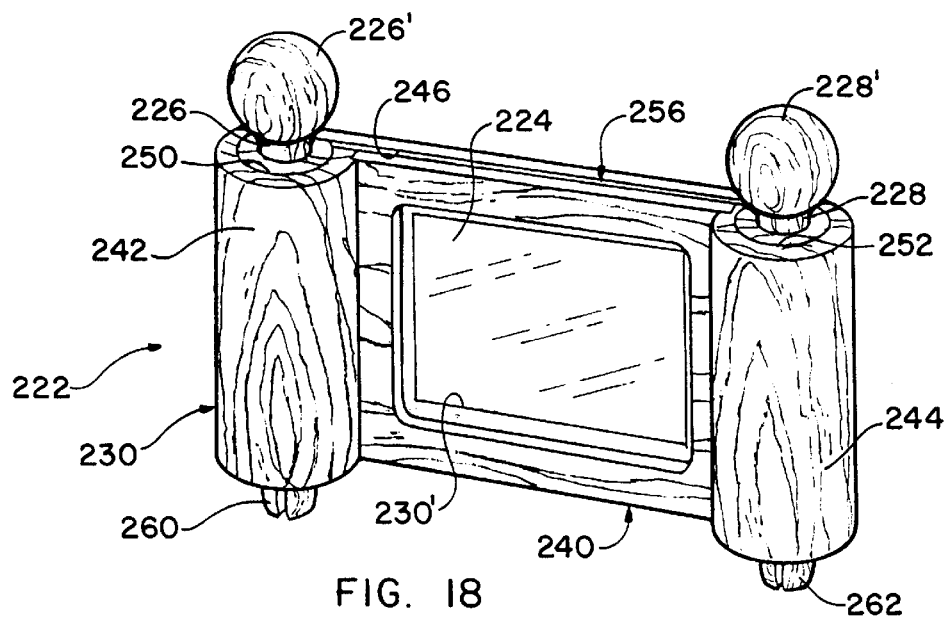
FIG. 18 is a perspective view of the scroll display device or lectern of the second preferred embodiment of the present invention.

Lectern 222, containing a scroll 224, is shown in detail in FIG. 18.

Figure 19:
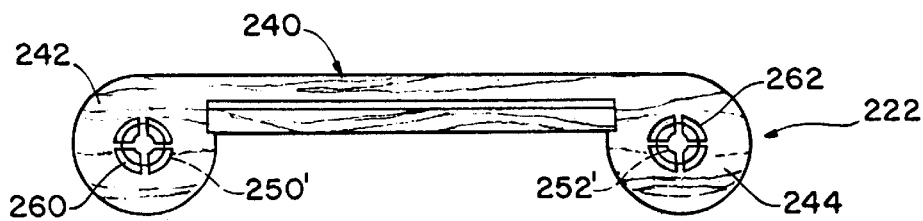
FIG. 19 is a bottom view of the lectern shown in FIG. 18.

A plan view of lectern 222, taken from below, is shown in FIG. 19.

Figure 20:
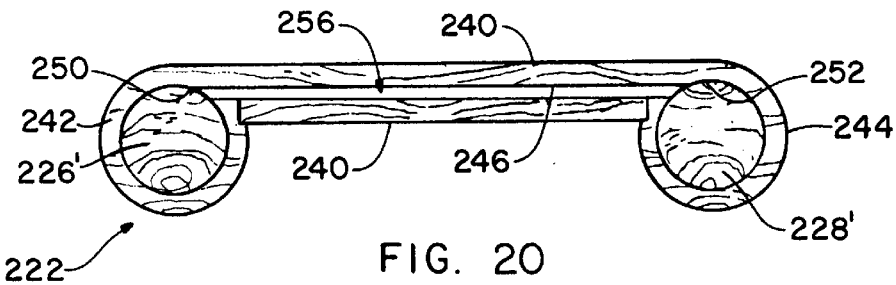
FIG. 20 is a top view of the lectern shown in FIG. 18.

A plan view of lectern 222 is shown in FIG. 20.

Figure 21:
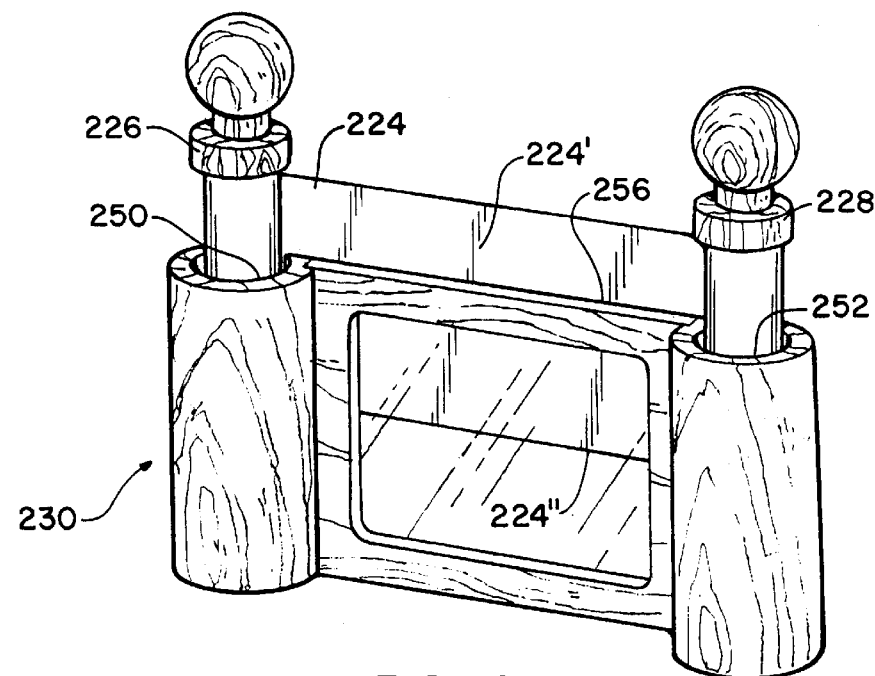
FIG. 21 is a perspective view of the lectern of the second preferred embodiment of the present invention, with a scroll partly inserted thereinto or removed therefrom.

FIG. 21 shows a scroll 224 of the present invention in the process of being removed from or installed in lectern body 230.

Figure 22:
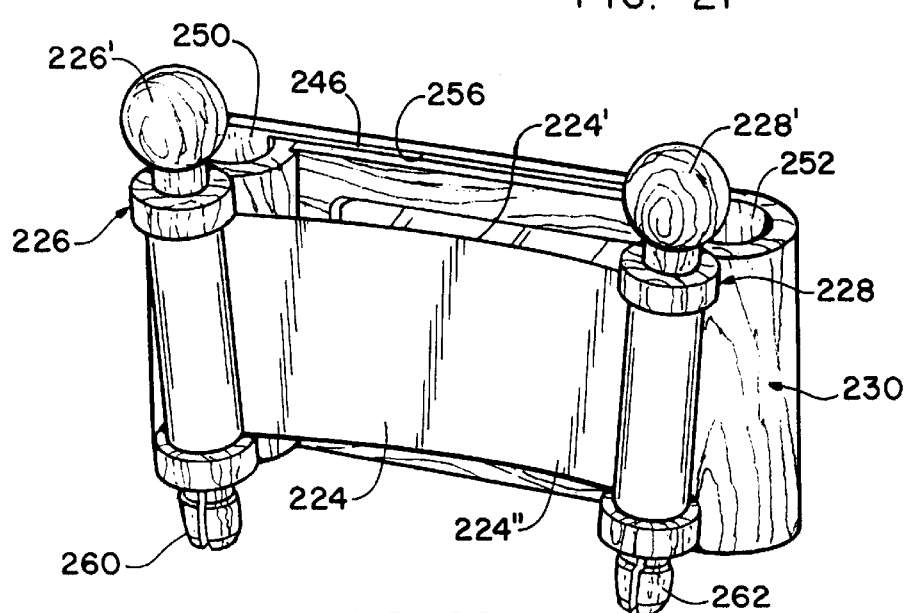
FIG. 22 is a perspective view of the lectern shown in FIG. 21, with the scroll completely removed therefrom and placed in front thereof.

FIG. 22 shows a scroll 224 of the present invention and its associated spindles 226, 228, with lectern body 230, unprovided with a scroll, disposed behind it.

As will be evident to those having ordinary skill in the art, informed by the present disclosure, a single devotional and learning device of the present invention will include one lectern body 230 and a plurality of scrolls all of which generally correspond in structure and function to scroll 224 (FIG. 22), mounted on two spindles 226, 228, but are imprinted with different texts, e.g., different selections of scriptural passages.

The format of a scroll of the second preferred embodiment, i.e., the arrangement of the text imprinted thereon, corresponds generally to the format of the scrolls associated with the lectern of FIG. 1 as described hereinabove in connection with the first preferred embodiment.

In view of the above, it will now be evident to those having ordinary skill in the art, informed by the present disclosure, that the scroll display window 230' of lectern 222 (FIG. 17) generally corresponds in structure and function to scroll display window 30' of the first preferred embodiment, and that thus the text of this specification relating to display window 30' also describes display window 230', except as noted hereinafter.

FIGS. 23 and 24 are elevational views of lectern 222 of the second preferred embodiment, showing the planar rear face 278 and the planar right side face 280 thereof.

FIG. 25 is a perspective view of spindle 226, showing the reference numerals desinating particular parts thereof.

In accordance with a further feature of the present invention, a rubber or Neoprene O-ring 226.21 is tight-fittingly engaged in a circumferential groove 226.22 which extends completely around the outer face of bearing portion 226.2 (FIG. 25). O-ring 226.21 fits tightly in its associated spindle well, e.g., 50 (FIG. 6), thus damping the movement of the spindle and making one-handed operation possible.

In general, the text of this specification relating to particular parts of the first embodiment describes the corresponding parts of the second embodiment whose reference numerals differ from the reference numerals designating said particular parts of the first embodiment by 200, except as noted hereinafter.

Figure 26:
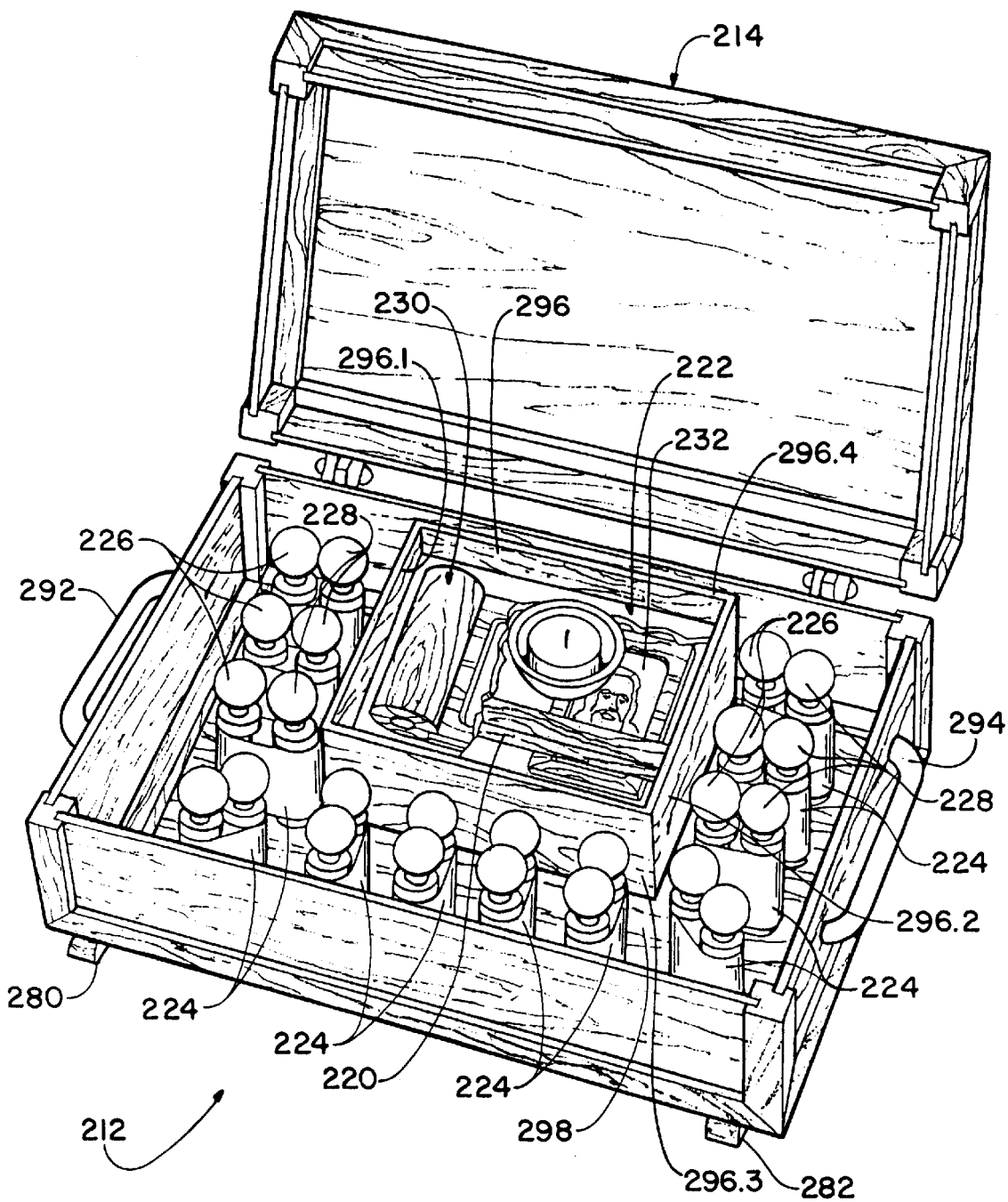
FIG. 26 is a perspective view of the chest of the devotional and learning device of the second preferred embodiment of the present invention, shown in its open condition and containing the other parts of the devotional and learning device along with a plurality of scrolls adapted for use in the lectern of the devotional learning device of the second preferred embodiment of the present invention, all of which scrolls are on mounting means which are themselves affixed to the interior of said chest.

Referring now to FIG. 26, there is shown the chest 212 of the second preferred embodiment in its open condition.

As seen in FIG. 26, chest 212 does not only differ from chest 12 of the first preferred embodiment in its vertical aspect ratios, i.e., ratios of width to height and depth (back to front) to height, but also in the arrangement of its interior and its contents (comparing FIG. 26 with FIG. 15).

Referring to FIG. 26, it will be seen that chest 212 contains a central well 296 which is defined by four walls 296.1, 296.2, 296.3, 296.4.

(It is to be noted that reference numeral 296 and the following reference numerals referring to the second preferred embodiment are not numerically related to the reference numerals referring to the first preferred embodiment.)

Referring again to FIG. 26, it will be seen that chest 212 contains a plurality of scrolls 224, each of which is mounted on an associated pair of spindles 226, 228.

As will be evident to those having ordinary skill in the art, informed by the present disclosure, the floor 298 of chest 212, or a wooden slab disposed upon the floor of chest 212, is provided with a suitable plurality of socket holes (not shown) which are adapted to close-fittingly receive the respective lower ends 260, 262 of the respective pairs of scroll spindles 226, 228, whereby the scrolls 224 can be mounted in chest 212, secure against motion of chest 212, or even the inversion thereof.

As also seen in FIG. 26, the height of each of the scroll spindles 226, 228 (excluding the length of its associated lower end) is such that when lid 214 is closed each scroll spindle mounted in one of said socket holes is maintained captive therein by the close proximity of its upper end to lid 214.

It will be understood, then, that in contrast with the first preferred embodiment each scroll of the second preferred embodiment is substantially permanently affixed to its two associated scroll spindles Referring now to FIGS. 27 through 34, there is illustrated the third preferred embodiment of the present invention.

Figure 27:
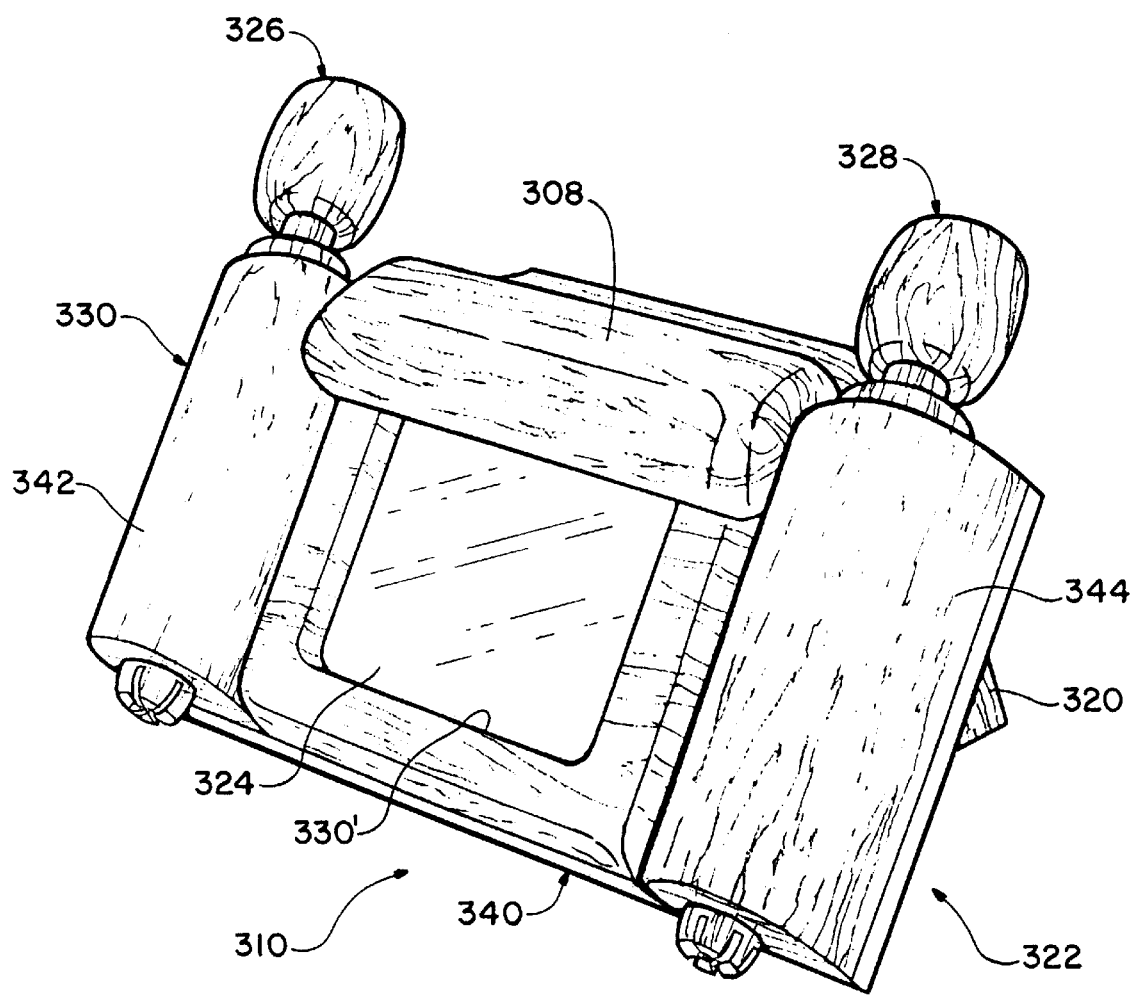
FIG. 27 is a perspective view of the scroll display device or lectern of the third preferred embodiment of the present invention.

Referring to FIG. 27 there is shown a perspective view of devotional and learning device 310 of the third preferred embodiment of the present invention.

It is to be understood that devotional and learning device 310 does not include a chest, as do the first two embodiments of the present invention shown and described herein.

It is also to be noted that, as best seen in FIG. 31, the pedestal 320 of the device of the third preferred embodiment is integrated with the scroll display device or lectern 330.

For descriptions of elements common to the first and third embodiments of the present invention, it should be noted that the reference numerals designating a particular common part in the first preferred embodiment may be obtained by substracting 300 from the reference numeral designating the same part in the third preferred embodiment, except as noted hereinafter.

It is further to be noted that the scroll 324 contained in display device 330 is electrically illuminated by means of one or more miniature incandescent lamps contained in hood 308, which lamps are energized by a battery contained in pedestal 320.

It is also to be noted that spindle housings 342, 344 and main body portion 340 of display device 330 correspond in structure and function to spindle housings 42, 44 and main body portion 40 of display device 22 of the first preferred embodiment of the present invention.

The provision of hood 308 and the electrical incandescent lamp contained therein, along with the excitation circuit for the lamp, including the supply battery contained in pedestal 320, is within the scope of one having ordinary skill in the art, informed by the present disclosure.

It is further to be noted that certain changes in the relative dimensions and proportioning of the parts of spindle housings 342, 344, and the main body portion 340, to provide more aesthetic overall proportions of lectern 310 and to adapt lectern 310 to more comfortably accommodate the user's hands, and to be more comfortably viewed by the user are illustrated in FIGS. 27 and 31.

As best seen in FIG. 31, hood 308 is provided with an opening 308' through which scroll illuminating incandescent light issues from the interior of hood 308 and then impinges upon the scroll frame currently displayed in scroll display window 330' (FIG. 27).

The spindles 326, 328 (FIG. 27) upon which scroll 324 is mounted correspond in structure and function to the scroll spindles 26, 28 of the first preferred embodiment. It is to be understood, however, that the preferred method of affixing the ends of the scrolls of the third preferred embodiment to spindles 326, 328 is as shown in FIGS. 33 and 34, or some other method of substantially permanent affixation.

As seen in FIGS. 33 and 34, one end of scroll 324 is contained in a split 350 between two halves of central spindle rod 352. Projecting barbs, which project into split 350, may be provided to assure that said end of scroll 324 is positively engaged in split 350.

As further seen in FIG. 34, lower end cap 354 of spindle rod 352 is adapted to be frictionally engaged with the lower end of spindle rod 352, and upper end cap 326 of rod 352 is adapted to be fitted over the upper end of rod 352, and to be maintained thereon by means of a suitable spring retainer 358.

The lamp energizing circuit of devotional and learning device 310 is a simple series circuit including a battery (mounted in pedestal 320), a miniature incandescent lamp (mounted inside hood 308) and a manually operable switch 309 (FIGS. 31 and 32) all connected in series.

In accordance with another principal feature of the present invention said battery and lamp, or a combination of said battery, one or more lamps and one or more voltage dropping resistors, or both, are so selected that the total luminous output of the lamp or lamps is such that scroll frames located in window 330' can be comfortably read without eyestrain from continued reading of such frames when devotional and learning device 310, located in an otherwise completely unilluminated room, is juxtaposed to the user in the manner indicated hereinabove in connection with FIG. 16, and the amount of light projected into said otherwise unilluminated room is substantially imperceptible in the user's peripheral vision.

Referring now to FIGS. 35 through 38 there is shown a devotional and learning device 410 of the fourth preferred embodiment of the present invention.

Comparing FIGS. 35 through 38 with FIGS. 27 through 34, it will be seen that devotional and learning device 410 is of the same general type as that of devotional and learning device 310 of the third preferred embodiment in that it does not include a chest, and in that it does consist of a pedestal 420 and a lectern body 430 which is integrally joined with pedestal 420.

The principal difference between the devotional and learning devices of the third and fourth preferred embodiments of the present invention lies in the mode of illuminating the associated scroll 424 which is viewable through display window 430'.

As explained above in connection with FIGS. 27 through 34, the scroll 324 contained in display device or lectern 322 is illuminated by reflected light emanating from one or more incandescent lamps located within hood 308, impinging upon scroll 324, and reflected from scroll 324.

By contrast, scroll 424 contained in display device 422 is illuminated by transmitted light, i.e., light which emanates from incandescent lamps 423 which are located behind the plane of scroll 424 as seen in FIG. 7 and then passes through scroll 424.

It is to be particularly noted that there are two incandescent lamps 423 which are located near the opposite ends of display window 430', and that neither lamp is located directly behind display window 430'.

Referring to FIG. 38, it will be seen that a push button switch 421 is fixed in an opening in a side wall of pedestal 420.

The lamp energizing circuit which energizes incandescent lamps 423 is a simple series-parallel circuit which interconnects lamps 423, switch 421, and the source of suitable low-voltage which is connected to devotional and learning device 410 by means of power cord 425 and its associated plug 427, which cooperates with socket 429 in the well known manner. It is to be understood that power cord 425 is connected at its end opposite plug 427 to a plug-in converter of well known type which itself is provided with prongs which are pluggable into the socket of a conventional electrical receptacle, e.g., a wall receptacle, from which to derive 117 volt alternating current power.

Thus, it will be understood that the lamp energizing circuit of devotional and learning device 410 is supplied with low voltage direct current power by means of said conventional converter.

It is also to be understood that in accordance with the present invention said lamp energizing circuit so energizes incandescent lamps 423 that the portion of scroll 424 located in scroll frame 430' is transilluminated to such an extent that portions of scroll 424 can be comfortably viewed, successively, for an extended period of time when device 410 is located in an otherwise unilluminated room, and the interior of said room is substantially imperceptible to the peripheral vision of the user.

Referring now to FIG. 38, it will be seen though a cutout 431, that in the fourth preferred embodiment, display screen 430' is comprised of two plates of glass or other transparent material, i.e., an outer transparent plate 433 and an inner transparent plate 435.

As also seen in FIG. 38, the scroll 424 being displayed in devotional and learning device 410 passes between outer transparent plate 433 and inner transparent plate 435.

For discussion of elements common to the first and fourth preferred embodiments of the present invention, it should be noted that the reference numeral designating a particular common part of the first preferred embodiment may be obtained by subtracting 400 from the reference numeral designating the corresponding common part of the fourth preferred embodiment, except as noted hereinafter.

Figure 39:
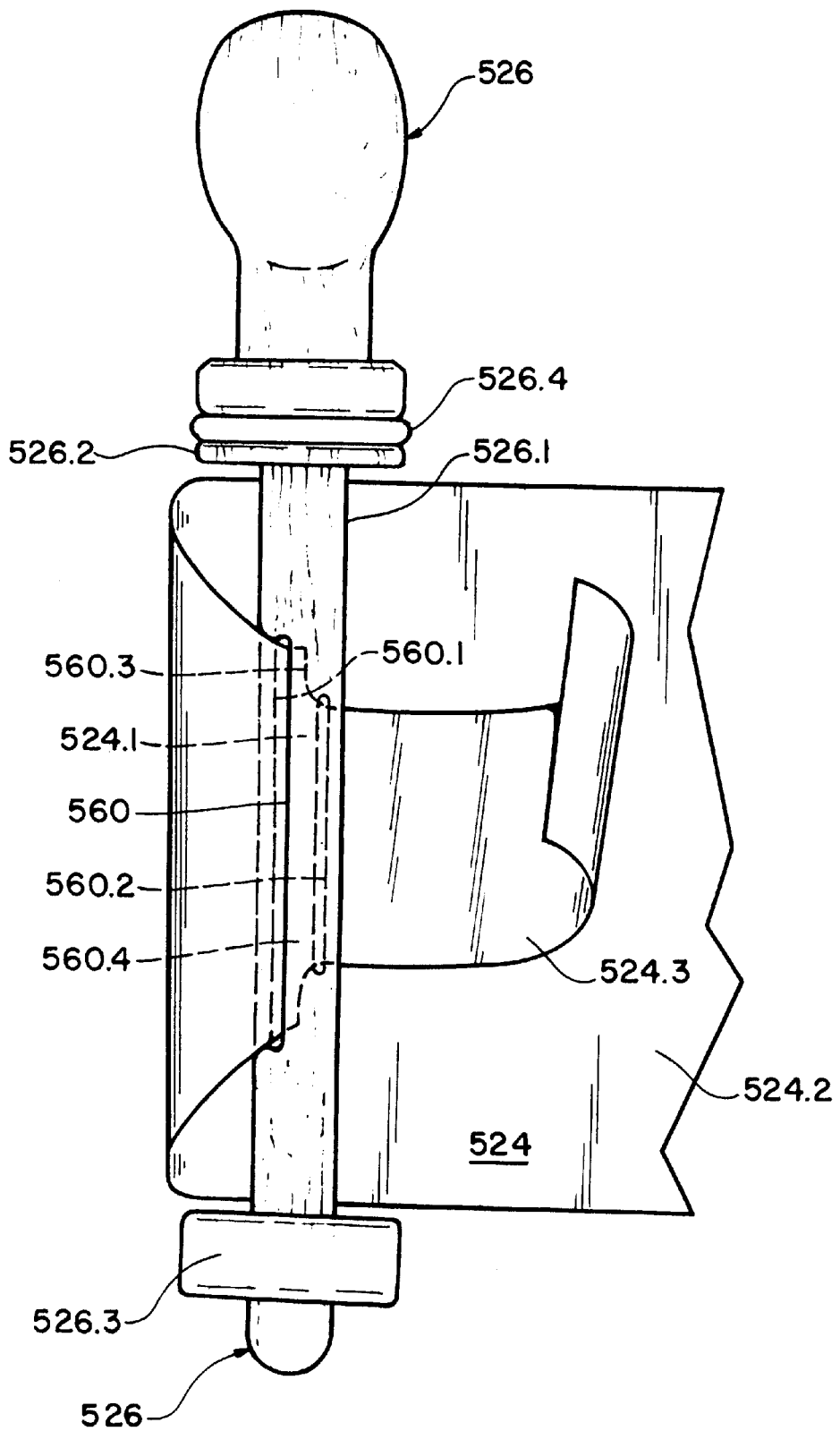
FIG. 39 is an elevational view of a particular scroll and associzted spindle of a particular embodiment ofthe present invention.

Referring now to FIG. 39, there is shown a scroll 524 and an associated spindle 526 which, along with a second scroll 528, can be used to advantage in connection with many embodiments of the present invention.

As seen in FIG. 39, spindle 526 is comprised of a central portion or shaft 526.1. Shaft 526.1 is provided with a slot 560 which extends completely through shaft 526.1, from open end 560.1 to open end 560.2.

As also seen in FIG. 39, slot 560 is tapered in the sense that open end 560.1 of slot 560 is considerably longer than open end 560.2 of slot 560, and that open ends 560.1 and 560.2 are joined by the tapered sidewalls 560.3 and 560.4 of slot 560.

Further, in accordance with the present invention, and as seen in FIG. 39, the end of scroll 524 cooperating with spindle 526 has a portion 524.1, intermediate main body portion 524.2 and tail portion 524.3, and the contour of scroll portion 524.1 is congruent with the contour of slot 560, and that the width of tail portion 524.3 is slightly less than the width of slot 560.

It follows, then, that when scroll tail portion 524.3 has been passed completely through slot 560, scroll portion 524.1 is seated in slot 560, and thus scroll 524 is centered between end members 526.2 and 526.3 of spindle 526, thus preventing binding between scroll 524 and one or both of these end members.

End member 526.2 is preferably provided with an O-ring 526.4 for the reasons discussed above in connection with O-ring 226.22 shown in FIG. 25.

It is to be noted that the end of scroll 524 opposite the end shown in FIG. 39 is configured so as to be congruent with the end of scroll 524 shown in FIG. 39; and that the spindle 528 which cooperates with the end of scroll 524 opposite the end thereof shown in FIG. 39 is substantially identical with spindle 526, which is provided with a slot substantially identical to slot 560.

It will be understood by those having ordinary skill in the art, informed by the present disclosure, that the objects set forth above, among those made apparent from the preceding description, are efficiently attained, and since certain changes may be made in the above constructions and the methods carried out thereby without departing from the scope of the present invention, it is intended that all matter contained in the above description or shown in the accompanying drawings shall be interpreted as illustrative only, and not in a limiting sense.

It is also to be understood that the following claims are intended to cover all of the generic and specific features of the invention herein described, and all statements of the scope of the invention which, as a matter or language, might be said to fall therebetween.

What is claimed is:

1. A devotional and learning device, comprising:
   an elongated housing, said housing including a scroll receiving cavity having a pair of spindle receiving wells and a slot disposed parallel to the long axis of said housing and interconnecting said spindle receiving wells, each one of said spindle receiving wells having a bottom and a cylindric side wall;
   a pair of spindles, one of said spindles being received for rotational movement within a first one of said pair of spindle receiving means and another one of said spindles being received for rotational movement within a second one of said spindle receiving means;
   a scroll display window for displaying seratim selected frames of a scroll wherein said scroll is attached to said first spindle and to said second spindle; and
   friction producing means, mounted on at least one of said pair of spindles and disposed between the spindle and its respective spindle receiving well for providing resistance to rotational movement of said spindle in relation to the cylindrical side wall of said well wherein at least one of said pair spindles includes a circumferential groove and said friction producing means is an O ring mounted in said groove.

2. A devotional and learning device as claimed in claim 1 including light source means for illuminating each frame of said scroll which is displayed in said scroll display window.

3. A devotional and learning device as claimed in claim 2 in which said light source means is comprised of at least one incandescent lamp which is contained in an opaque hood located above said scroll display window.

4. A devotional and learning device as claimed in claim 2 in which said scroll is translucent and is transilluminated by light emitted by said light source means.

5. A devotional and learning device as claimed in claim 2 wherein said light source means is located within said housing.

6. A devotional and learning device as claimed in claim 1, further comprising a pedestal which supports said spindle housings at such an angle to the horizontal that said spindle housings and associated knobs are comfortably graspable by the user of the device when said user is using said scroll displaying screen.

7. A devotional and learning device as claimed in claim 6 in which each of said spindles is provided with a knob which projects from the upper end of its associated spindle housing, whereby the frame of the scroll displayed in said display window may be manually selected by manipulation of the knobs of the device by the user thereof.

8. A devotional and learning device as claimed in claim 1 wherein each one of said pair of spindles includes a knob at one end and a plurality of coaxially disposed fingers at an opposite end.

9. A devotional and learning device as claimed in claim 8 wherein each one of said spindle receiving well bottoms has an opening therein formed for receipt, respectively, of said coaxially disposed fingers for rotatable movement therein.

10. A devotional and learning device as claimed in claim 1 wherein said housing includes a hood disposed over said window.

11. A devotional and learning device as claimed in claim 1 wherein said housing includes a pedestal for support of said housing.

* * * * *